US010258925B2

(12) United States Patent
Lau et al.

(10) Patent No.: US 10,258,925 B2
(45) Date of Patent: Apr. 16, 2019

(54) EMISSIONS TREATMENT APPARATUS AND A METHOD FOR TREATING EMISSIONS

(71) Applicant: City University of Hong Kong, Kowloon (HK)

(72) Inventors: Siu Chuen Lau, Kowloon (HK); Roy A. L. Vellaisamy, Kowloon (HK); Joseph Chung Kai Wong, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 15/284,871

(22) Filed: Oct. 4, 2016

(65) Prior Publication Data

US 2018/0093224 A1 Apr. 5, 2018

(51) Int. Cl.
*B01D 53/92* (2006.01)
*B01D 53/79* (2006.01)
*B01D 53/56* (2006.01)
*B03C 3/017* (2006.01)
*F01N 3/20* (2006.01)
*F01N 3/08* (2006.01)
*B01D 53/76* (2006.01)

(52) U.S. Cl.
CPC ............ *B01D 53/92* (2013.01); *B01D 53/56* (2013.01); *B01D 53/76* (2013.01); *B01D 53/79* (2013.01); *B03C 3/017* (2013.01); *F01N 3/0892* (2013.01); *F01N 3/20* (2013.01); *B01D 2251/104* (2013.01); *B01D 2251/202* (2013.01); *B01D 2258/01* (2013.01); *B03C 2201/30* (2013.01); *F01N 2240/04* (2013.01); *F01N 2570/10* (2013.01); *F01N 2570/14* (2013.01); *F01N 2610/00* (2013.01)

(58) Field of Classification Search
CPC ........ B01D 53/92; B01D 53/56; B01D 53/79; B01D 2251/104; B03C 3/017; B03C 2201/30; F01N 3/0892; F01N 3/20; F01N 2240/04; F01N 2570/10; F01N 2570/14
USPC ........................................................ 423/212
See application file for complete search history.

(56) References Cited

U.S. PATENT DOCUMENTS

2011/0226989 A9 * 9/2011 Seeker ............... B01D 53/1418
252/182.33

* cited by examiner

*Primary Examiner* — Daniel McCracken
(74) *Attorney, Agent, or Firm* — Renner Kenner Greive Bobak Taylor & Weber

(57) ABSTRACT

An emissions treatment apparatus includes a first mechanism arranged to receive an exhaust gas, wherein the first mechanism is supplied with a first substance arranged to react with a first exhaust compound to process the exhaust gas, the first substance being chemically derived from an electrolyte source. The emissions treatment apparatus further comprises a second mechanism arranged to receive the exhaust gas after its reaction with the first exhaust compound; wherein the second mechanism receives a second substance arranged to react with a second exhaust compound to further process the exhaust gas, the second substance being chemically derived from an electrolyte source.

19 Claims, 4 Drawing Sheets

EMISSIONS TREATMENT APPARATUS AND A METHOD FOR TREATING EMISSIONS

TECHNICAL FIELD

The present invention relates to an emissions treatment apparatus and a method for treating emissions, and particularly, although not exclusively, to an emissions treatment apparatus and a method for treating emissions with a substance chemically derived from an electrolyte source to react with an exhaust compound of an exhaust gas.

BACKGROUND

Air pollution is one of the major environmental challenges facing the world today. According to the 2014 WHO report, air pollution in 2012 caused the deaths of around 7 million people worldwide, an estimate roughly matched by the International Energy Agency.

The introduction of contaminants into the natural environment may cause adverse changes to human life. For instance, smog hanging over cities is the most familiar and obvious form of visible air pollution. The impact of pollution is even more severe in developing countries than developed countries, where the competitiveness of these countries is economically depended on extraction of natural resources and heavy industries.

Air pollution is a significant risk factor for a number of pollution-related diseases and health conditions affecting millions of people annually. Over the past 30 years, researchers have identified a wide array of health effects including respiratory diseases such as asthma and changes in lung function, lung cancers, COPD, heart diseases, cardiovascular diseases, adverse pregnancy outcomes such as preterm birth, stroke and etc. These are believed to be associated with air pollution exposure.

SUMMARY OF THE INVENTION

To address at least some of the above problems, the presently disclosed an emissions treatment apparatus comprising a mechanism arranged to receive an exhaust gas, wherein the mechanism is supplied with a substance arranged to react with an exhaust compound to process the exhaust gas.

In accordance with a first aspect of the present invention, there is provided an emissions treatment apparatus comprising: a first mechanism arranged to receive an exhaust gas, wherein the first mechanism is supplied with a first substance arranged to react with a first exhaust compound to process the exhaust gas, the first substance being chemically derived from an electrolyte source.

In an embodiment of the first aspect, the emissions treatment apparatus further comprises a second mechanism arranged to receive the exhaust gas after its reaction with the first exhaust compound; wherein the second mechanism receive a second substance arranged to react with a second exhaust compound to further process the exhaust gas, the second substance being chemically derived from an electrolyte source.

In an embodiment of the first aspect, the first mechanism is selected from a burner mechanism and a reactor mechanism, and the second mechanism is the remainder of the burner mechanism or the reactor mechanism.

In an embodiment of the first aspect, the first and second substances are chemically derived from the same electrolyte source.

In an embodiment of the first aspect, the electrolyte source includes water.

In an embodiment of the first aspect, the first substance is selected from oxygen and hydrogen gas, and the second substance is the remainder of oxygen and hydrogen gas.

In an embodiment of the first aspect, the first exhaust compound is selected from tiny carbon particle and $NO_x$, and the second exhaust compound is the remainder of tiny carbon particle and $NO_x$.

In an embodiment of the first aspect, the burner mechanism is supplied with oxygen and in turn the oxygen is converted to ozone for burning the tiny carbon particle to carbon dioxide.

In an embodiment of the first aspect, the reactor mechanism is supplied with hydrogen gas for reducing the $NO_x$ to nitrogen gas.

In an embodiment of the first aspect, the ozone is restrained from releasing to the atmosphere by the existence of the tiny carbon particle and CO with high turbulence in the exhaust gas.

In an embodiment of the first aspect, the burner mechanism further comprises an electrostatic precipitator for enhancing the burning rate of the carbon particle.

In an embodiment of the first aspect, the electrostatic precipitator is arranged to trap particles inside the burner mechanism for burning to reduce the emission.

In an embodiment of the first aspect, the electrostatic precipitator is targeted to capture carbon particle size from 5 nm to 500 nm.

In an embodiment of the first aspect, the electrostatic precipitator is targeted to capture the small particles.

In an embodiment of the first aspect, the trapped particles react with ozone within the burner mechanism at a low temperature for sufficient time.

In an embodiment of the first aspect, the ozone burns the carbon particles without jamming the filter of the apparatus.

In an embodiment of the first aspect, the $NO_x$ reacts with hydrogen gas effectively at a low temperature within the reactor mechanism without the need of any catalyst or chemical compounds such as urea or ammonia.

In an embodiment of the first aspect, the reactor mechanism delays the reaction duration, thereby facilitating the particle collision within the reaction while minimizing the back pressure opposing to the exhaust gas.

In an embodiment of the first aspect, the apparatus is arranged to complement an existing diesel/gasoline/fossil fuels component.

In an embodiment of the first aspect, the emissions of the existing diesel/gasoline/fossil fuels component are manipulated by existing emissions treatment technology.

In an embodiment of the first aspect, the existing emissions treatment technology are selected from Gasoline/Diesel/fossil fuels Particulate Filter, Lean $NO_x$ Traps, Selective Catalytic Reduction, Exhaust Gas Recirculation and the like.

In accordance with a second aspect of the present invention, there is provided a method for treating emissions comprising the steps of: receiving an exhaust gas; chemically deriving a first substance from an electrolyte source; and reacting the first substance with a first exhaust compound for processing the exhaust gas.

In an embodiment of the second aspect, the method further comprises the steps of: receiving the exhaust gas after its reaction with the first exhaust compound; chemically deriving a second substance from an electrolyte source; and reacting the second substance with a second exhaust compound for further processing the exhaust gas.

In an embodiment of the second aspect, the first and second substances are chemically derived from the same electrolyte source.

In an embodiment of the second aspect, the electrolyte source includes water.

In an embodiment of the second aspect, the first substance is selected from oxygen and hydrogen gas, and the second substance is the remainder of oxygen and hydrogen gas.

In an embodiment of the second aspect, the first exhaust compound is selected from tiny carbon particle and $NO_x$, and the second exhaust compound is the remainder of tiny carbon particle and $NO_x$.

In an embodiment of the second aspect, the method further comprises the step of burning the tiny carbon particle to carbon dioxide with ozone converted from oxygen.

In an embodiment of the second aspect, the method further comprises the step of reducing the $NO_x$ to nitrogen gas with hydrogen gas.

In an embodiment of the second aspect, the method further comprises the step of enhancing the burning rate of the carbon particle with an electrostatic precipitator.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Without wishing to be bound by theory, the inventors, through their own research via trials and experimentations, have discovered that emission from road vehicles is one of the major air pollution sources. In general, vehicle life cycle is presumed to be 15 years or even more across different regions of the world. Despite its high emission, these vehicles can legally operate on roads with excessive emissions for several years. However, the reduction of emission requires the modification of the fundamental engine design per se, thus it is almost impossible to rectify the worsening situation unless all vehicles are eliminated or replaced.

For the newer vehicles such as those that are designed to comply with Euro 5 and Euro 6 standards, the technology has stretched its limit to achieve the emission goals and fulfil the more stringent emission standards or regulations across multi jurisdictions. However, through their researches, the inventors have discovered that the existing automobile technology, in general, is still far away to achieve the required emission standards. Furthermore, such situation also applies to all other vehicles run by fossil fuel such as aircrafts, ships, boilers, machineries and generators.

The inventors have further discovered that even though the vehicles equipped with the existing emissions treatment technology is likely to pass the laboratory emissions testings, it is not necessary that the mass produced vehicles may also meet the international emission standards in real-world driving. Such deviation may be contributed by several factors. For instance, the emissions treatment technology may not function effectively if the operating temperature is outside the desired range, the excessive back pressure of the filters against the exhaust gas flow or any other factors may not be taken into account in practice.

To address at least some of the above problems, or to at least mitigate some of the above problems, the inventors have devised a very low running cost and simple add-on mechanism which shows a significant improvement to old and new engine systems to cut emissions. The changes do not require any substantial modification of engine or combustion portions. As the emission has been reduced by embodiments of the present invention, the combustion engine or similar equipment can be operated at higher efficiency with a reduction in carbon footprint.

Figure 1:
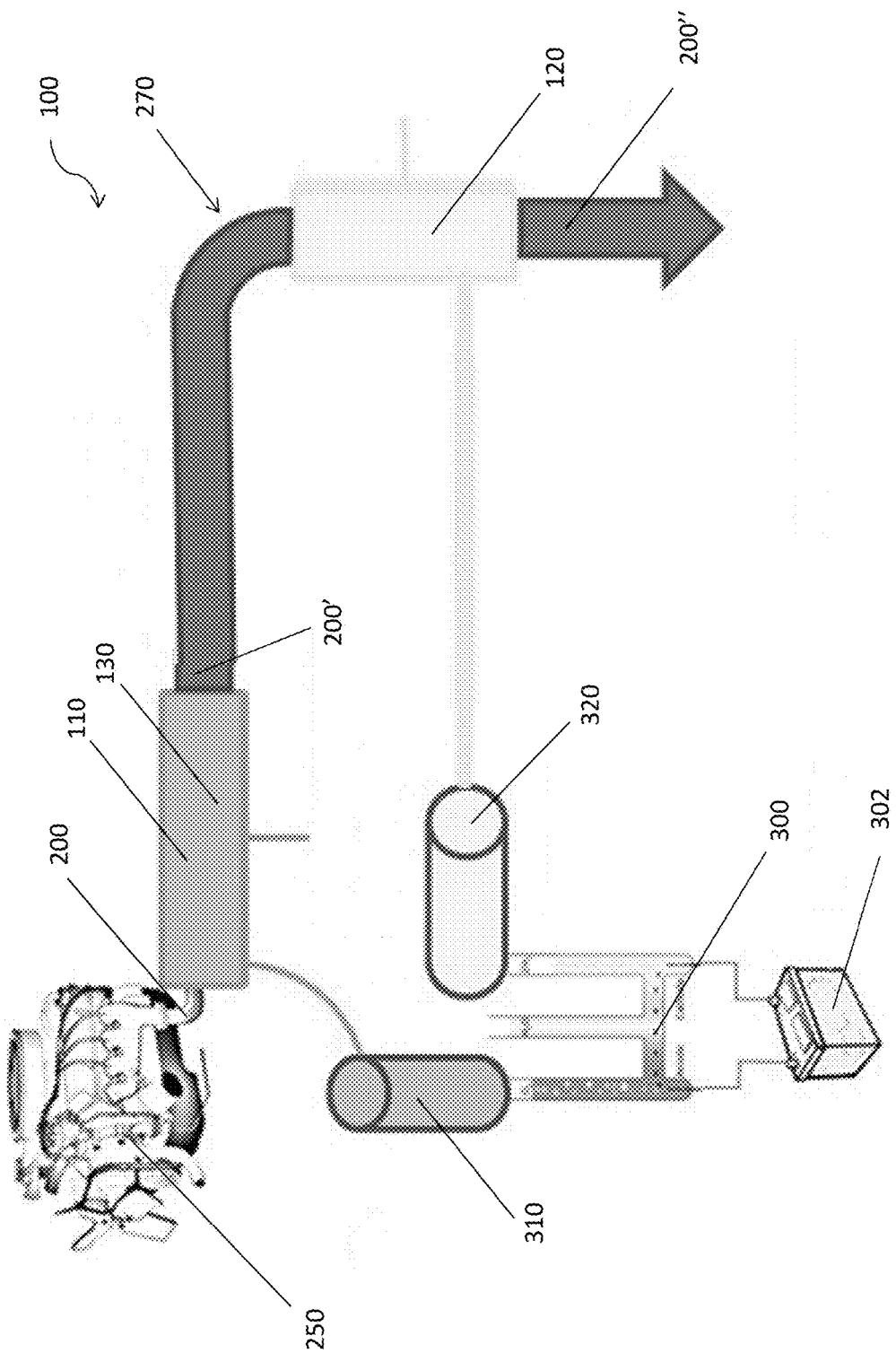
FIG. 1 is a schematic view of an emissions treatment apparatus in accordance with one embodiment of the present invention.

With reference to FIG. 1, there is provided an example embodiment of an emissions treatment apparatus 100 comprising: a first mechanism 110 arranged to receive an exhaust gas 200, wherein the first mechanism 110 is supplied with a first substance 310 arranged to react with a first exhaust compound 210 to process the exhaust gas 200, the first substance 310 being chemically derived from an electrolyte source 300. In this example embodiment, the emissions treatment apparatus 100 may further comprise a second mechanism 120 arranged to receive the exhaust gas 200' after its reaction with the first exhaust compound 210; wherein the second mechanism 120 receive a second substance 320 arranged to react with a second exhaust compound 220 to further process the exhaust gas 200', the second substance 320 being also chemically derived from an electrolyte source 300.

In this embodiment, the apparatus 100 comprises a first mechanism 110 for receiving a first substance 310, a second mechanism 120 for receiving a second substance 320 and optionally an electrolyte source 300. The electrolyte source 300, which may be, for example, water, may undergo electrolysis with the electricity supplied by a power storage component 302, e.g. a car battery to provide a first substance 310 such as oxygen at the anode and a second substance 320 such as hydrogen gas at the cathode. Each of the oxygen 310 and hydrogen gas 320 is supplied to the first mechanism 110 and the second mechanism 120 respectively. Alternatively, the oxygen 310 and hydrogen gas 320 may be chemically derived from other chemical reactions, or supplied to the first mechanism 110 and the second mechanism 120 as compressed gas respectively.

In this embodiment, the exhaust gas 200 may be emitted from a running diesel/gasoline/fossil fuels engine 250, with a significant amount of chemical compounds such as carbon particles serving as the first exhaust compound 210 and $NO_x$ serving as the second exhaust compound 220. To protect and preserve our environment, these chemical compounds must be processed by one or more treatment processes before releasing exhaust gas 200 to the atmosphere.

Figure 2:
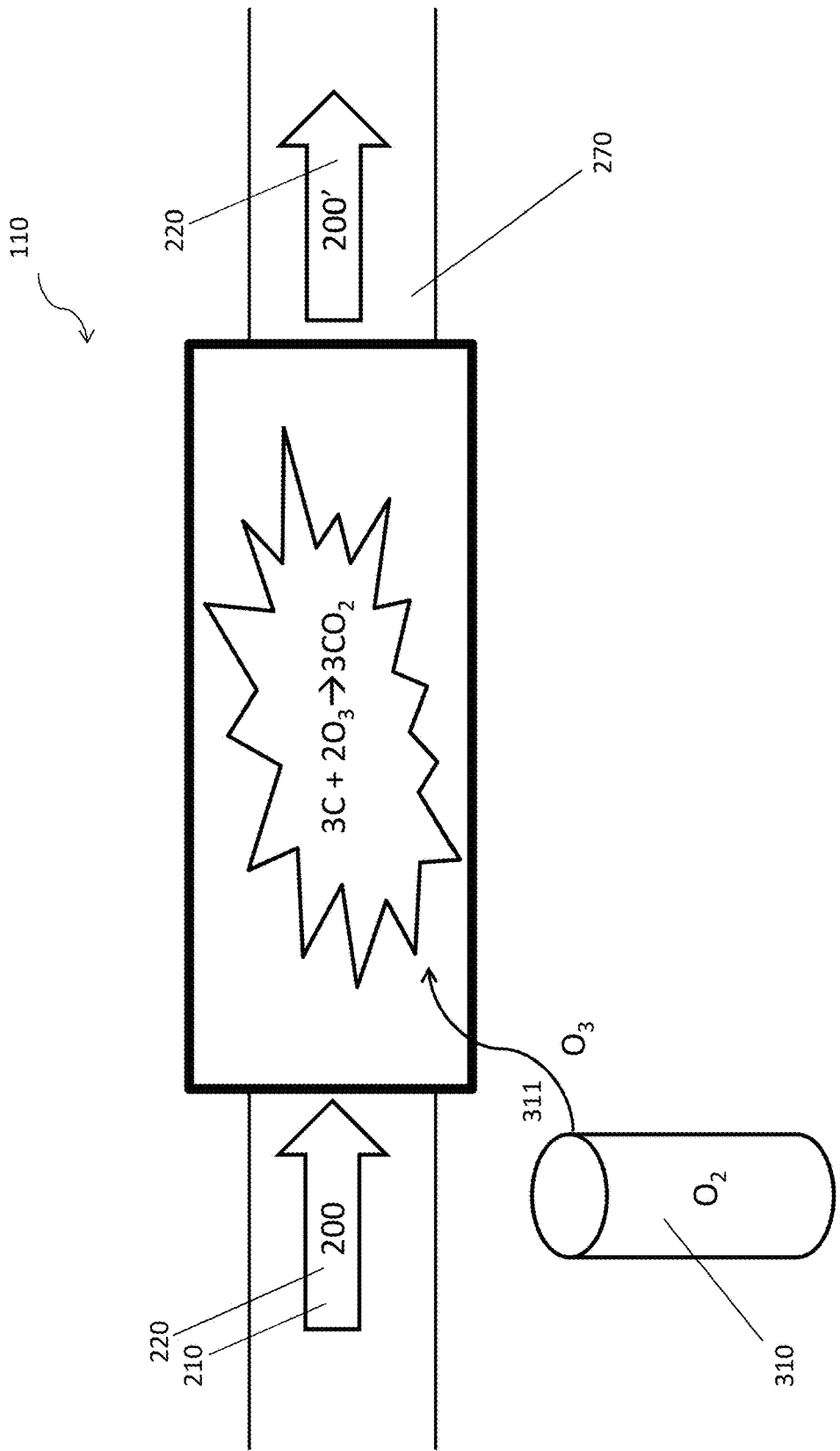
FIG. 2 is a schematic view showing the chemical reaction within a burner mechanism of the emissions treatment apparatus in FIG. 1.

With reference to FIG. 2, there is provided a first mechanism 110 for receiving the exhaust gas 200 from the engine 250 through the exhaust pipe 270. Preferably, the first mechanism 110 may be a burner mechanism supplied with oxygen 310 which is being converted into ozone 311, thereby burning the tiny carbon particles 210 from the exhaust gas 200 to carbon dioxide $CO_2$ within the carbon burner 110.

As appreciated by a person skilled in the art, ozone $O_3$ is an unstable compound with a relatively short half-life comparing with air. For example, ozone $O_3$ only has a half-life of 1.5 second in 250° C. static air. Advantageously, the ozone 311 in the present invention is restrained from releasing to the atmosphere by the co-existence of the tiny carbon particle 210 and carbon monoxide with high turbulence in the exhaust gas 200.

Optionally, the burner mechanism 110 may further comprise an electrostatic precipitator 130 for enhancing the burning rate of the carbon particles 210 therein. The electrostatic precipitator 130 is arranged to trap particles inside the burner mechanism 110 for burning to reduce the emission. Since the size of the carbon particles 210 in exhaust gas 200 is mainly ranged from 5 nm to 500 nm, the electrostatic precipitator 130 only targets to capture 30-50% of such small particles, such that the trapped particles may react with ozone 311 within the burner mechanism 110 at low temperature for sufficient time.

The reactions at the burner mechanism 110 are as follow:

$$3C + 2O_3 \rightarrow 3CO_2;$$

$$2CO + O_2 \rightarrow 2CO_2;$$

$$3CO + O_3 \rightarrow 3CO_3;$$

Preferably, the present invention is feasible for working effectively within a wide range of operating temperatures. In this embodiment, the reactivity of the chemical process $C + O_2 \rightarrow CO_2$ is low because the temperature of the exhaust pipe 270 is below 600° C. However, since the apparatus 100 is provided with ozone 310 for burning the carbon particles 210 efficiently, the filter is unlikely to get jammed.

As appreciated by a person skilled in the art, the burning rate increases with the temperature because carbon reacts faster with oxygen at high temperature. Therefore, even if regeneration of filter is required, the apparatus 100 may still work effectively at high temperature.

Figure 3:
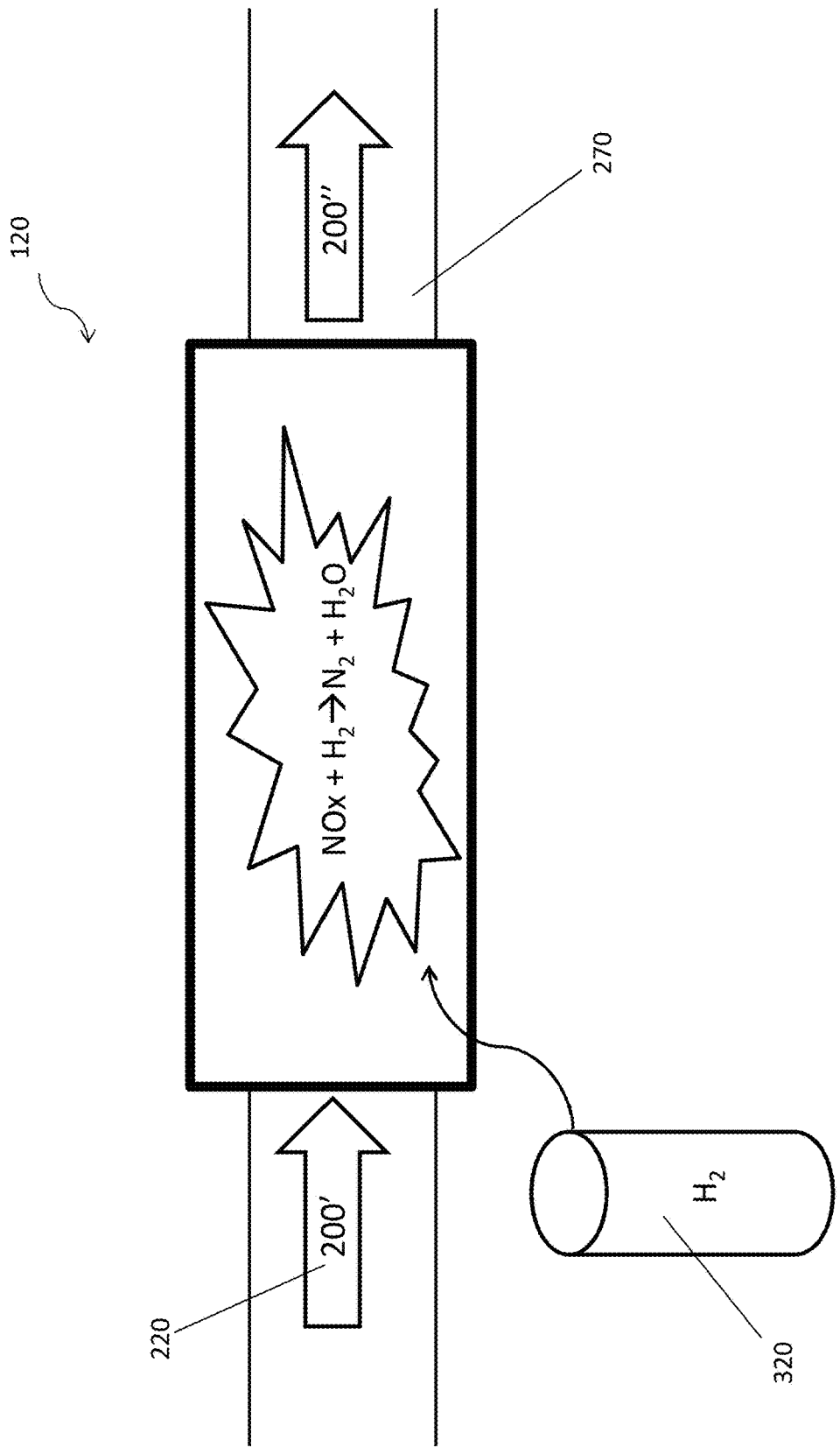
FIG. 3 is a schematic view showing the chemical reaction within a reactor mechanism of the emissions treatment apparatus in FIG. 1.

With reference to FIG. 3, there is further provided a second mechanism 120 for receiving the exhaust gas 200' from the first mechanism 110 through the exhaust pipe 270. Preferably, the second mechanism 120 may be a reactor mechanism supplied with hydrogen gas 320. The hydrogen gas 320, as a reducing agent, reduces the $NO_x$ 220 to nitrogen gas $N_2$ within the $NO_x$ reactor 120.

Preferably, the temperature at the reactor mechanism 120 will be much lower than 400° C. under normal condition. As it would be appreciated by a person skilled in the art, there would be no effective $NO_x$ 220 reduction without any catalysts or chemical compounds such as urea or ammonia at such low temperature. Advantageously, there is provided with hydrogen gas 320 in this embodiment for enhancing the reduction rate at such low temperature. At this point, $NO_x$ 220 reacts with hydrogen gas 320 and produces water $H_2O$ and nitrogen gas $N_2$ effectively. As it would also be appreciated by a person skilled in the art, hydrogen gas 320 is not a pollutant and it would react with oxygen to become water once it is discharged to the atmosphere.

Optionally, the reactor mechanism 120 may lengthen the exhaust pipe 270 and delay the reaction duration of the $NO_x$ 220, thereby allowing more reaction time and triggering more particle collisions for reactions. Preferably, the back pressure opposing to the flow of the exhaust gas 200 that is induced by the prolonged reaction may be substantially neglected, as it is barely a minimal back pressure comparing with the current technology such as catalyst filter module and any other filtering means.

Advantageously, the local temperature at the exhaust point of the engine 250, which is at the upstream of the combined burner mechanism 110 and electrostatic precipitator 130, may be slightly higher than the rest of the apparatus. This is contributed by the burning of tiny carbon particles 210 with ozone 310. On the other hand, there would be only trivial temperature changes at the local $NO_x$ reactor 120, as the $NO_x$ 220 content and the associated energy change is relatively small compared with the rest of the apparatus 100.

The inventors have, through their own research, trials and experiments, devised that existing emissions treatment technology such as Gasoline/Diesel/fossil fuels Particulate Filter (GPM/DPM), Lean $NO_x$ Traps (LNT), Selective Catalytic Reduction (SCR), and Exhaust Gas Recirculation (EGR) are not performing effectively due to one or more restrains associated with their physical and chemical characteristics.

For instance, Gasoline/Diesel/fossil fuels Particulate Filter (GPM/DPM) may trap the carbon particles and burns away the particles through the soot oxidation by at high temperature up to 600° C. with the aiding of catalyst such as Platinum and Rhodium. As a routine process, the control system increases the temperature to remove those particles stuck to the filter. However, the control system may not be able to reach a high enough temperature to completely remove the trapped particles. Therefore, it requires regular offline maintenance or even replacement of the filter.

The inventors have discovered that in some real-world driving situations, it is common practice for the drivers to increase the temperature of the engine and regenerate the filter that is seriously blocked by the particles with a hard acceleration. However, this may shorten the life cycle of the filter and at worse, burn the filter if temperature becomes too high and break the GPM/DPM mechanism entirely.

Turning to Lean $NO_x$ Traps (LNT), the system may absorb $NO_x$ during normal lean operation period and releases the absorbed $NO_x$ during rich operation period in every cycle alternately. This requires sophisticated air-fuel management system to provide suitable conditions to regenerate the trap. The efficiency of the LNT process is also limited by the physical size of the trap.

The inventors have further discovered that the precious metal catalysts may only activate the LNT process at high temperature. However, this may be problematic as the catalysts may not function in low temperature during low speed driving. The catalysts may even melt in high temperature at heavy loading such as high speed driving on highway or uphill driving. Once the catalysts are melted, saturated or used up, undesirable high $NO_x$ emission would occur. Another shortcoming of LNT is that it requires 10-12 g of precious metal catalyst for a 2 L engine and thus the burden of cost is also another issue to consider before adopting LNT.

With regard to Selective catalytic reduction (SCR), urea or ammonia is provided as a reducing agent and also as a catalyst to reduce the operating temperature. Although $NO_x$ can be reduced to nitrogen significantly by this technology, the weakness of this system lies in that the mixing ratio of vapourized urea or ammonia with $NO_x$ must be controlled precisely between a ratio of 0.9 and 1.0 to completely reduce $NO_x$. If ammonia leaks or exceeds this ratio limit, the leaked or excessive ammonia would become another pollutant. To address this additional issue, another catalytic filter for the removal of $NH_3$ is required.

The inventors have further discovered that the control system is required to be maintained at a temperature of higher than 200° C. to avoid formation of explosive ammonium nitrate $NH_4NO_3$. However, the engine exhaust gas may not reach a high enough temperature in general during start up. At such low ambient temperature, the urea is being frozen and thus heating of urea tank and/or draining the lines is required. Therefore, the reduction of $NO_x$ emissions at initial driving would be ineffective.

Lastly, the Exhaust Gas Recirculation (EGR) may neither provide desirable reduction effect to $NO_x$ emissions. By exhaust gas recirculation, the engine temperature can be eased to reduce $NO_x$. This is incorporated into the engine performance control system with air/fuel mixing ratio control i.e. Lean/Rich mixing control. Although the mechanism works fine to comply with the Euro 5 standard, the mechanism fails to comply with the tougher requirement of Euro 6 standard.

In particular, the lower engine temperature may ease the engine output power adversely when loading is high, such that the efficiency of the engine at low temperature would be undesirable. On the other hand, in response to the engine temperature increases for higher output power, the NO emission would become too high. At this point, the removal performance of DOC (Diesel Oxidation Catalyst) and LNT may no longer reduce all of the excessive $NO_x$ emission, thus it fails to meet the latest Euro 6 emission requirements.

In the aforementioned embodiment, the apparatus 100 may serve as a standalone emissions treatment apparatus 100 as depicted in FIG. 1. In an alternative embodiment, the apparatus 100 may be arranged as a very low running cost and simple add-on auxiliary emissions treatment apparatus 1000 as depicted in FIG. 4 to complement an existing diesel/gasoline/fossil fuels component 400 without adopting any substantial modification to the overall design of the component 400.

In these existing diesel/gasoline/fossil fuels components 400, the emissions discharged from the engine 250 are being manipulated by existing emissions treatment technology. For example, the carbon particles 210 are being filtered by Gasoline/Diesel/fossil fuels Particulate Filter, while the $NO_x$ 220 emissions are being reduced by Lean $NO_x$ Traps, Selective Catalytic Reduction, Exhaust Gas Recirculation, yet the emissions control is still undesirable. With the complement of the emissions treatment apparatus 1000, the performance of these existing emissions treatment technology is significantly improved.

Figure 4:
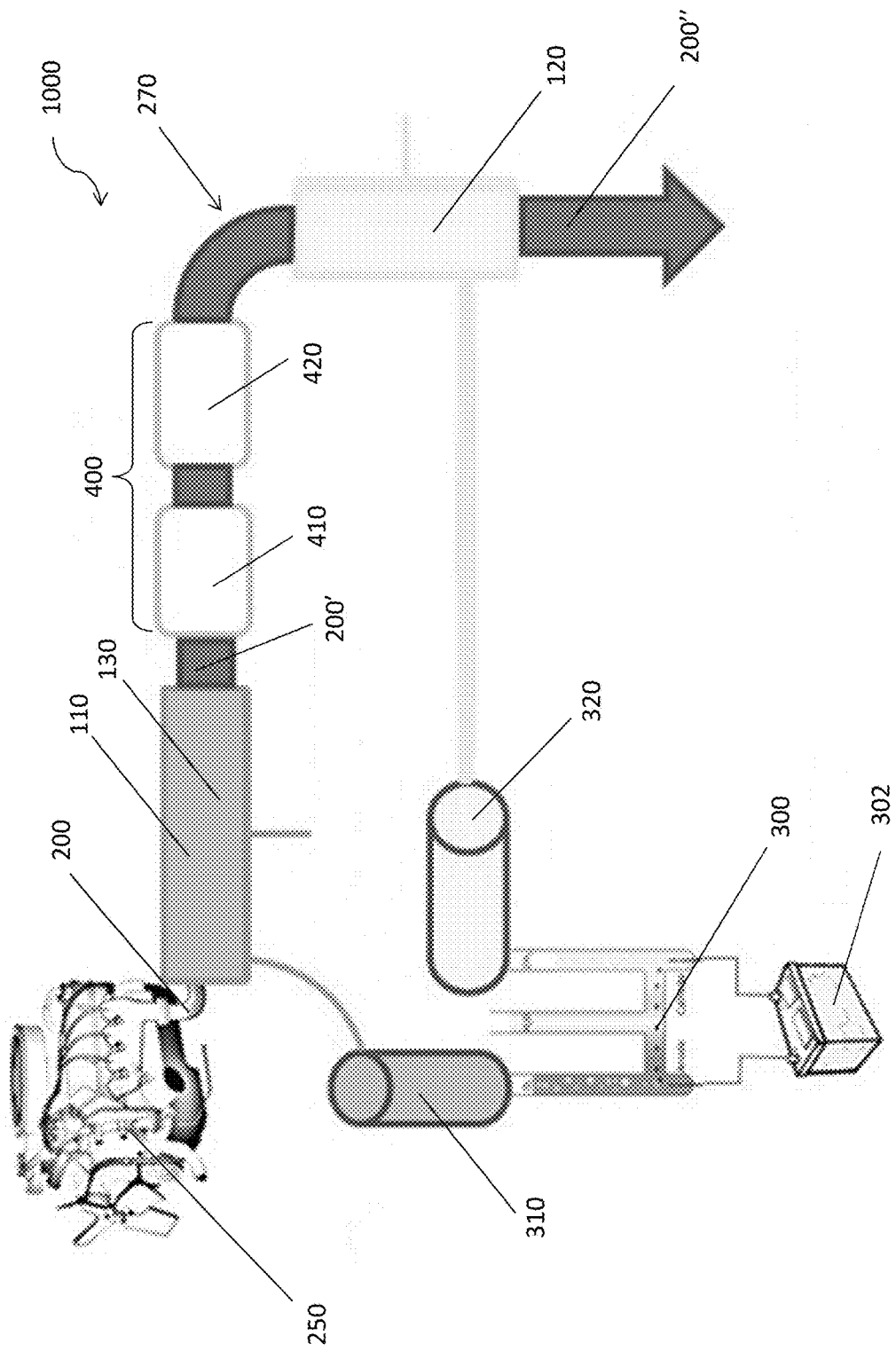
FIG. 4 is a schematic view of an emissions treatment apparatus as an add-on mechanism to existing emissions treatment technology in accordance with another embodiment of the present invention.

With reference to FIG. 4, the exhaust gas 200 is first received by the burner mechanism 110 from the engine 250 and the carbon particles 210 in the exhaust gas 200 may be burnt by the ozone 310 supplied from the electrolyte source 300. Upon completion of the reaction, the processed gas 200' may then be outflowed from the burner mechanism 110 and introduced into a series of existing diesel/gasoline/fossil fuels components 400 such as Gasoline/Diesel/fossil fuels Particulate Filter 410, Lean $NO_x$ Traps, Selective Catalytic Reduction, Exhaust Gas Recirculation 420 etc. for performing their original operations, and in turn the processed gas 200' are being received by the reactor mechanism 120 for reducing the $NO_x$ 220 therein with the hydrogen gas 320 supplied from the electrolyte source 300. The processed exhaust gas 200" is finally discharged to the atmosphere.

Advantageously, the apparatus 100/1000 is provided with ozone 311 for burning away the tiny carbon particles 210 within the burner mechanism 110, such that the soot is not jammed within the filters. It is also advantageous that only an ignorable back pressure would be exerted on the exhaust gas 200. Thus, the apparatus may reduce tiny carbon particles 210 efficiently, especially when its performance is compared to the Gasoline/Diesel/fossil fuels Particulate Filter mechanism.

Preferably, the apparatus 100/1000 is provided with hydrogen gas 320 for reducing the $NO_x$ 220 with hydrogen gas 320 to nitrogen gas within the reactor mechanism 120. Since hydrogen gas 320 is merely a natural and non-pollutant gas, it is not necessary to control the absorption and reduction of $NO_x$ 220 precisely as per Lean $NO_x$ Traps. Advantageously, the apparatus 100 is also a low cost solution to the reduction of $NO_x$ 220, as it requires no precious metal catalysts as compared to the Lean $NO_x$ Traps mechanism.

Comparing with Selective catalytic reduction, there exists no risk in the usage of apparatus 100/1000 as hydrogen gas 320 is not harmful to the environment and only a small quantity of hydrogen 320 is used in this embodiment. On the other hand, Selective catalytic reduction requires precise control over urea/air ratio, the usage of catalyst and extra running cost of urea. The inventors have also discovered that there would be additional back pressure incurred by the filters for $NO_x$ reduction and extra filters for ammonia slip to prevent the harmful ammonia from escaping to the atmosphere.

Advantageously, the apparatus 100/1000 may be operated in all temperature range that will appear for $NO_x$ 220 reduction, such that the engine 250 can operate at a relatively high engine temperature, even during high output power as compared to Exhaust Gas Recirculation. This allows the engine 250 to be operated at higher efficiency condition, since extra $NO_x$ 220 will be reduced by the apparatus 100/1000.

It will be appreciated by persons skilled in the art that the example embodiments may be applied to all types of combustion engines including but not limited to vehicles, ships and electric generator.

It will be also appreciated by persons skilled in the art that the example embodiments may be applied to all types of boilers that using fossil fuels including but not limited to coal, oil and gas.

It will be also appreciated by persons skilled in the art that the example embodiments may be applied to all types of furnaces that using fossil fuels including but not limited to coal, oil and gas.

It will be also appreciated by persons skilled in the art that the example embodiments may be applied to all types of equipment that using fossil fuels including but not limited to coal, oil and gas.

It will be also appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An emissions treatment apparatus comprising:
   an electrolyte source arranged to chemically derive a first substance and a second substance,
   a first mechanism arranged to receive an exhaust gas, wherein the first mechanism receives the first substance arranged to react with a first exhaust compound to process the exhaust gas, and
   a second mechanism arranged to receive the exhaust gas after its reaction with the first exhaust compound;

wherein the second mechanism receives the second substance arranged to react with a second exhaust compound to further process the exhaust gas.

2. The apparatus according to claim 1, wherein the first mechanism is selected from a burner mechanism and a reactor mechanism, and the second mechanism is the remainder of the burner mechanism or the reactor mechanism.

3. The apparatus according to claim 1, wherein the electrolyte source includes water.

4. The apparatus according to claim 1, wherein the first substance is selected from oxygen and hydrogen gas, and the second substance is the remainder of oxygen and hydrogen gas.

5. The apparatus according to claim 1, wherein the first exhaust compound is selected from tiny carbon particle and $NO_x$, and the second exhaust compound is the remainder of tiny carbon particle and $NO_x$.

6. The apparatus according to claim 2, wherein the burner mechanism is supplied with oxygen and in turn the oxygen is converted to ozone for burning the tiny carbon particle to carbon dioxide.

7. The apparatus according to claim 2, wherein the reactor mechanism is supplied with hydrogen gas for reducing the $NO_x$ to nitrogen gas.

8. The apparatus according to claim 6, wherein the ozone is restrained from releasing to the atmosphere by the existence of the tiny carbon particle and CO with high turbulence in the exhaust gas.

9. The apparatus according to claim 6, wherein the burner mechanism further comprises an electrostatic precipitator for enhancing the burning rate of the carbon particle.

10. The apparatus according to claim 9, wherein the electrostatic precipitator is arranged to trap particles inside the burner mechanism for burning to reduce the emission.

11. The apparatus according to claim 10, wherein the electrostatic precipitator is targeted to capture carbon particle size from 5 nm to 500 nm.

12. The apparatus according to claim 10, wherein the electrostatic precipitator is targeted to capture small particles.

13. The apparatus according to claim 10, wherein the trapped particles react with ozone within the burner mechanism at a low temperature for sufficient time.

14. The apparatus according to claim 10, wherein the ozone burns the carbon particles without jamming the filter of the apparatus.

15. The apparatus according to claim 7, wherein the $NO_x$ reacts with hydrogen gas effectively at a low temperature within the reactor mechanism without the need of any catalyst or chemical compounds such as urea or ammonia.

16. The apparatus according to claim 7, wherein the reactor mechanism delays the reaction duration, thereby facilitating the particle collision within the reaction while minimizing the back pressure opposing to the exhaust gas.

17. The apparatus according to claim 1, wherein the apparatus is arranged to complement an existing diesel/gasoline/fossil fuels component.

18. The apparatus according to claim 17, wherein the emissions of the existing diesel/gasoline/fossil fuels component are manipulated by existing emissions treatment technology.

19. The apparatus according to claim 18, wherein the existing emissions treatment technology are selected from Gasoline/Diesel/fossil fuels Particulate Filter, Lean $NO_x$ Traps, Selective Catalytic Reduction, Exhaust Gas Recirculation.

* * * * *